No. 750,375. PATENTED JAN. 26, 1904.
H. KNIPHALS.
POTATO DIGGER.
APPLICATION FILED JULY 13, 1903.
NO MODEL.
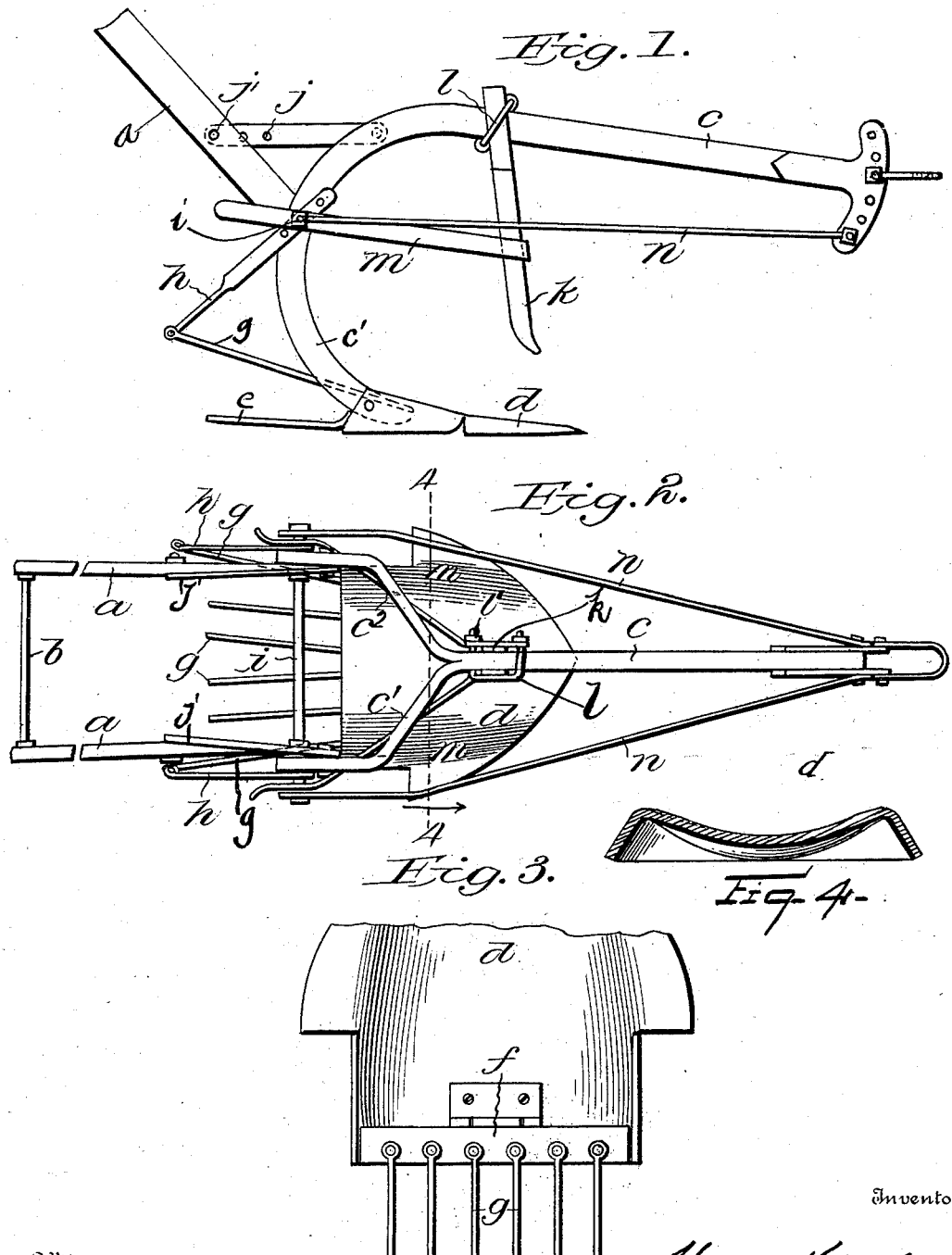

UNITED STATES PATENT OFFICE.

HENRY KNIPHALS, OF DAVENPORT, IOWA.

POTATO-DIGGER.

SPECIFICATION forming part of Letters Patent No. 750,375, dated January 26, 1904.

Application filed July 13, 1903. Serial No. 165,341. (No model.)

*To all whom it may concern:*

Be it known that I, HENRY KNIPHALS, a citizen of the United States of America, residing at Davenport, in the county of Scott and State of Iowa, have invented certain new and useful Improvements in Potato-Diggers, of which the following is a specification.

This invention relates to harrows and diggers, and particularly to a subclass thereunder known as "potato-diggers."

An object of the invention is to provide a potato-digger having a novel plowshare, which will collect and direct the potatoes to the separator.

Furthermore, an object of the invention is to provide a series of rods adjustable vertically in order to vary the incline of the rods comprising the separator.

Furthermore, an object of the invention is to produce novel forms of weed-fenders, two of which coöperate to deflect weeds from the plowshare and separator.

Furthermore, an object of the invention is to produce a novel frame comprising diverging members, in which a single bolt is employed to connect and brace the diverging members and to which are connected the handles, weed-fenders, and the separator-adjusting means.

Finally, the object of the invention is the production of a potato digger and separator which will possess advantages in points of simplicity and efficiency, proving at the same time comparatively inexpensive to produce and maintain.

With the foregoing and other objects in view the invention consists in the details of construction and in the arrangement and combination of parts to be hereinafter more fully set forth and claimed.

In describing the invention in detail reference will be had to the accompanying drawings, forming part of the specification, wherein like characters denote corresponding parts in the several views, and in which—

Figure 1 illustrates a side elevation of a potato-digger embodying the invention. Fig. 2 is a plan view thereof. Fig. 3 illustrates a fragment of the under surface of the plowshare and separating-rods. Fig. 4 is a sectional view on the line 4 4 of Fig. 2.

In the drawings, $a\ a$ denote the handle-bars, which are connected near their outer ends by the rod $b$ for the purpose of adjusting the said handle-bars with relation to each other. The beam or draft-bar $c$ terminates at the rear into diverging frame-bars $c'\ c^2$, which are curved under to receive the fastenings for the plowshare $d$. The plowshare is concaved transversely and differs in this respect from plowshares of ordinary construction which have a convexed upper surface. Guide-pieces or heel-plates $e$ are secured by the same fastenings as the plowshare, said guide-pieces or heel-plates extending rearwardly on a plane with the plowshare.

On the under surface of the plowshare is a plate $f$, hinged in place to swing vertically, and said plate carries a series of separator-bars $g$, which are riveted or otherwise secured to the hinged plate. The two outer separator-bars have eyes formed at their ends to receive the adjustable hangers $h$, the said hangers having holes in their upper ends whereby they are adjustably secured to the frame of the plow in order to vary the incline of the separator-bars.

The handles $a$ have a series of holes, and the braces $j$ are adjustably secured to the handles and to the frame of the plow, so that the outer ends of the handles may be raised or lowered, according to the desire of the user, it being understood that the braces $j$ may have a series of holes therein to afford the adjustment described. The braces and handle-bars are connected by a bolt $j'$.

Weed-deflecting devices are provided, and the deflector comprises a vertically-disposed bar $k$, having a furcated upper end in which the beam $c$ is embedded, and two diverging members $m$, secured near the lower end of the bar $k$, extend rearwardly outside of the frame. The bar $k$ is secured in place on the beam by means of the yoke $l$, which lies diagonally across the bar $k$ and beam $c$, and is secured in place by means of the nuts $l'$, as fully shown in Fig. 2.

The diverging members $m$, the hangers $h$, and the handles $a$ are secured in place by a single bolt $i$, passing through the diverging members of the frame $c'$ and $c^2$. The said bolt $i$ is also employed as a connection for the weed-deflectors $n$, which extend from the front end of the beam $c$ to the said bolt. By means of the deflectors $n$ and $m$ the weeds are turned from the plowshare and will not clog the separator-bars.

The plowshare on each side has a depending flange to which the members of the frame $c'$ and $c^2$ are secured by rivets or otherwise. The rod or bolt $i$ may be of any ordinary construction, but preferably having a head with a screw-threaded outer shank to receive a nut for binding the several parts together.

The construction, operation, and advantages will, it is thought, be understood from the foregoing description, it being noted that various changes may be made in the proportions and details of construction for successfully carrying the invention into practice without departing from the scope thereof.

Having fully described the invention, what I claim as new, and desire to secure by Letters Patent, is—

1. In a potato-digger, a beam, frame and handles, a concaved plowshare secured to the frame; said share having downturned sides, guides secured to the sides and projecting rearwardly therefrom, separator-bars supported from the under surface of the plowshare and having a vertical swing, and means for adjustably supporting the bars.

2. In a potato-digger, a beam and frame, handles, a plowshare concaved transversely provided with downturned side flanges, guides secured to the flanges and extending rearwardly, a plate hinged under the plowshare, separator-bars secured thereto, means for supporting the bars in varying adjustments, weed-turners extending rearwardly and secured on a bolt common to the weed-turners, bar-hangers, frame and handles.

3. In a potato-digger, a suitable beam, frame and handles, a concaved plowshare secured to the frame, a plate hinged to the under surface of the plowshare, rods secured to the plate and projecting rearwardly and upwardly, hangers secured to the outer rods, means for adjustably securing the hangers with relation to the frame, weed-deflectors extending from the forward portion of the beam to the frame, a second set of deflectors extending from a point intermediately of the frame and end of the beam and frame and securing means common to weed-deflectors, the hanger-rods and the handles.

In testimony whereof I affix my signature, in the presence of two witnesses, this 6th day of July, 1903.

HENRY KNIPHALS.

Witnesses:
  HENRY H. ORTH,
  C. F. HOLMES.